(12) United States Patent
Schneidau

(10) Patent No.: US 10,513,010 B2
(45) Date of Patent: Dec. 24, 2019

(54) CONTROL OF PARTICLE SUPPLY OF BLASTING APPARATUS

(71) Applicant: SENTENSO GmbH, Datteln (DE)

(72) Inventor: Volker Schneidau, Datteln (DE)

(73) Assignee: sentenso GmbH, Datteln (DE)

( * ) Notice: Subject to any disclaimer, the term of this patent is extended or adjusted under 35 U.S.C. 154(b) by 114 days.

(21) Appl. No.: 15/539,794

(22) PCT Filed: Jan. 21, 2016

(86) PCT No.: PCT/EP2016/000110
§ 371 (c)(1),
(2) Date: Jun. 26, 2017

(87) PCT Pub. No.: WO2016/116277
PCT Pub. Date: Jul. 28, 2016

(65) Prior Publication Data
US 2018/0264625 A1 Sep. 20, 2018

(30) Foreign Application Priority Data

Jan. 22, 2015 (DE) .......................... 10 2015 000 632

(51) Int. Cl.
*B24C 7/00* (2006.01)
*B24B 57/04* (2006.01)

(52) U.S. Cl.
CPC .............. *B24C 7/0015* (2013.01); *B24C 7/00* (2013.01); *B24C 7/0053* (2013.01); *B24B 57/04* (2013.01)

(58) Field of Classification Search
CPC ......... B24B 57/04; B24C 7/00; B24C 7/0015; B24C 7/0053; B24C 9/00; G01G 11/00; G01G 17/04
See application file for complete search history.

(56) References Cited

U.S. PATENT DOCUMENTS 4,232,487 A * 11/1980 Brown ...................... B24C 5/02
451/88
4,354,622 A * 10/1982 Wood ................... G05D 7/0605
177/116

(Continued)

*Primary Examiner* — Timothy V Eley
(74) *Attorney, Agent, or Firm* — Andrew Wilford

(57) ABSTRACT

The invention relates to a method for adjusting or operating a particle-metering system for a particle blasting installation, in particular a blasting installation for the working of surfaces, the abrasive throughput of which is preset by means of a passing-through opening that can be varied on the basis of time and/or variables and is determined by means of a downstream throughput sensor as a throughput sensor signal (DS), wherein the throughput sensor signal (DS) is used for controlling a manipulated variable (SG) for the degree of setting of the passing-through opening, wherein to adjust the metering system for at least one value of the manipulated variable (SG) the actual throughput (D) through the passing-through opening is determined by means of a measurement of the weight of abrasive material (M) allowed through within a defined time period (Dt), and the manipulated variable (SG), the actual throughput (D) and the corresponding throughput sensor signal (DS) are stored in an assignment table, wherein the relations between the actual throughput (D), the manipulated variable (SG) and the throughput sensor signal (DS) are used during subsequent operation.

21 Claims, 3 Drawing Sheets

(56) References Cited

U.S. PATENT DOCUMENTS

| | | | | |
|---|---|---|---|---|
| 4,873,855 A * | 10/1989 | Thompson | ............... | B24C 1/10 |
| | | | | 72/53 |
| 5,520,572 A * | 5/1996 | Opel | ..................... | B24C 1/003 |
| | | | | 241/92 |
| 6,000,995 A | 12/1999 | Ruholl | | |
| 6,111,206 A * | 8/2000 | Maguire | ................ | G01F 11/18 |
| | | | | 177/116 |
| 6,402,363 B1 * | 6/2002 | Maguire | .................. | B01F 3/18 |
| | | | | 366/141 |
| 6,472,615 B1 * | 10/2002 | Carlson | .............. | G01G 13/024 |
| | | | | 177/105 |
| 8,277,288 B2 * | 10/2012 | Spivak | ................. | B24C 7/0069 |
| | | | | 451/100 |
| 8,299,374 B2 * | 10/2012 | Brandt | ................ | G01G 11/003 |
| | | | | 177/1 |
| 8,388,407 B1 * | 3/2013 | Champaigne | ........ | B24C 7/0053 |
| | | | | 451/2 |
| 10,179,696 B2 * | 1/2019 | Maguire | ............ | B65D 90/587 |
| 10,201,915 B2 * | 2/2019 | Maguire | .................. | B29B 7/24 |
| 2014/0045409 A1* | 2/2014 | Zhang | ................. | B24C 7/0046 |
| | | | | 451/2 |
| 2014/0220861 A1 | 8/2014 | Champaigne | | |
| 2015/0031270 A1* | 1/2015 | Miller | .................... | B24C 1/045 |
| | | | | 451/2 |
| 2016/0016289 A1 | 1/2016 | Benson | | |
| 2017/0334036 A1* | 11/2017 | Turner | ................ | B24C 7/0015 |

\* cited by examiner

Fig. 3
| SG | D | DS |
|---|---|---|
| SG_1 | D_1 | DS_1 |
| ... | ... | ... |
| SG_n | D_n | DS_n |
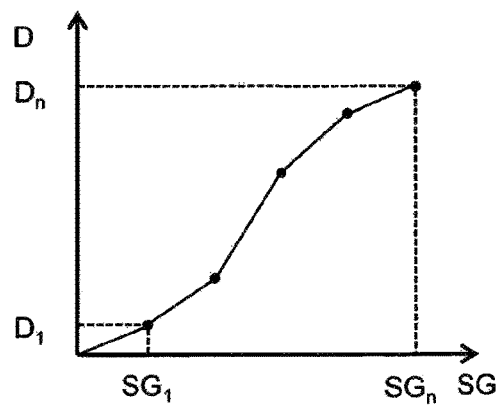
Fig. 4a
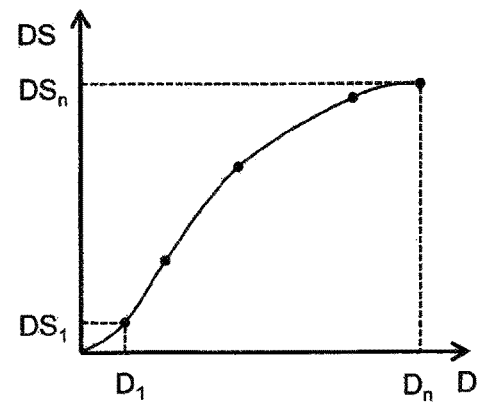
Fig. 4b

CONTROL OF PARTICLE SUPPLY OF BLASTING APPARATUS

CROSS REFERENCE TO RELATED APPLICATIONS

This application is the US-national stage of PCT application PCT/EP2016/000110 filed 21 Jan. 2016 and claiming the priority of German patent application 102015000632.0 itself filed 22 Jan. 2015.

FIELD OF THE INVENTION

The invention relates to a method of adjusting or operating a particle-metering system of a particle-blasting apparatus, particularly of a blasting apparatus for treating a surface where the particle throughput is preset by a feed orifice that can be varied with respect to time and/or variables and is determined by a downstream flow sensor generating a flow-sensor signal (DS), with the flow-sensor signal (DS) being used to control a manipulated variable (SG) for the output setting of the feed orifice.

In a particle-blasting apparatus used particularly for treating a surface, the particle throughput that is outputted to a workpiece for the purpose of working it is controlled via a feed assembly. This feed assembly is generally between a supply vessel in which the blasting particles is held and a system through which the blasting particles is accelerated and guided toward a workpiece. A compressed-air system or an impeller wheel is usually used to accelerate the blasting particles. Due to irregularities in the throughput of the blasting particles through the feed assembly, the particle throughput that is fed to the workpiece may not be constant. Such fluctuations in the particle throughput can be caused by nonuniform flow characteristics or other changing physical conditions during operation of the blasting apparatus.

To compensate for fluctuations in the throughput, a device is proposed in DE 102014201913 [US 2014/0220861] in which the particle throughput is maintained constant by variably controlling the opening of a valve in order to increase or reduce the throughput that is measured by a detection device. In this case, a baffle plate sensor is used as a detection device for determining the particle throughput from the deflection of a deflectable member, and the electrical characteristics of the particle material are unimportant in this measurement method. The signal of the baffle plate sensor is used to control how much the valve is opened, and the flow cross section is varied mechanically such that a constant quantity of blasting particles per unit of time is supplied. This principle for controlling the particle throughput is also used in a comparable manner with other detection devices and variable feed orifices.

However, the drawback of this solution is that, when the composition of the blasting particles changes and the physical characteristics change as a result, the detection device measures a throughput value that does not match the actual throughput. As a result, the right quantity of blasting particles for the blasting process is not fed to the workpiece. A change in the composition of the blasting particles can be brought about deliberately by changing the type of blasting particles, or it can change inadvertently as a result of contaminants or modification of the blasting particles as a result of repeated use.

Particularly in a particle-blasting apparatus used in a production line and in which a precise quantity of blasting particles is needed for the process, this constitutes a problem, since a change in the particle throughput has an impact on the processing quality.

OBJECT OF THE INVENTION

It is the object of the invention to overcome this drawback and to provide a method of adjusting or operating a feed assembly of a blasting apparatus whereby the feed assembly can be adjusted with minimal personnel and time and the particle throughput that is in fact required during operation is directly ensured.

SUMMARY OF THE INVENTION

This object is achieved by a method in which, in order to adjust the feed assembly for at least one manipulated variable (SG), the actual throughput (D) through the variable feed orifice is determined by measuring the weight of the outputted blasting particles (M) within a defined time period (Dt), and the manipulated variable (SG), the actual throughput (D), and the corresponding flow-sensor signal (DS) are stored in an allocation table, with the relationships between the actual throughput (D), the manipulated variable (SG), and the flow-sensor signal (DS) being used during subsequent operation.

The generation of the allocation table offers the advantage that a manipulated variable (SG) can be preset during the operation of the feed assembly following adjustment that corresponds to the actual required throughput (D). As a result, the particle throughput through the feed assembly takes on the required value, thus ensuring the desired processing quality during the blasting process.

In an advantageous embodiment of the invention, a functional correlation is calculated between the manipulated variable (SG) and the actual throughput (D) from the allocation table generated during the adjustment, in which, for a discrete number of values for the manipulated variable (SG), the corresponding actual throughput (D) and the corresponding flow-sensor signal (DS) are stored. As a result, a manipulated variable (SG) is extrapolated that corresponds or comes closest to the respective actual required throughput (D) even if a value is required for the actual throughput that is not stored as a discrete value in the allocation table. Consequently, an appropriate manipulated variable (SG) is available for controlling the feed orifice for every required throughput (D) that can be outputted by the feed assembly.

Likewise, in another advantageous embodiment of the invention, the actual throughput (D) is calculated from the allocation table as a function of the flow-sensor signal (DS). This makes it possible to determine the actual throughput (D) at least approximately for a measured flow-sensor signal (DS) that is not stored in the allocation table. The actual throughput (D) can thus be determined directly during operation from the flow-sensor signal (DS) and used to control or indicate and/or record the actual throughput (D).

In an advantageous embodiment of the invention, in order to calculate the manipulated variable (SG) as a function of the actual throughput (D) and to calculate the actual throughput (D) as a function of the flow-sensor signal (DS), a linear extrapolation is performed between the discrete values of the allocation table. This is a simple mathematical operation that can be performed with little computing power and can therefore be carried out relatively quickly during control with or without feedback.

In another advantageous embodiment of the invention, the manipulated variable (SG) as a function of the actual throughput (D) and the actual throughput (D) as a function of the flow-sensor signal (DS) is approximated by a polynomial. In order to at least roughly approximate the polynomial to the discrete values of the allocation table, it is necessary to use at least a second-order polynomial. It was found that approximation by a fourth-order polynomial usually ensures an adequate approximation to the discrete values of the allocation table with relatively little computing power. In another advantageous embodiment of the invention, besides approximation using a polynomial, the discrete values of the allocation table are correlated using a polynomial calculation. This is also an arithmetic operation that is associated with reasonable computational complexity and enables an adequate approximation to the discrete measured values of the allocation table.

In an advantageous embodiment of the invention, in order to adjust the feed assembly, the manipulated variable (SG) is altered by a program in discrete steps, and the actual throughput (D), the flow-sensor signal (DS), and the respective manipulated variable (SG) are stored in the allocation table for each discrete step.

Preferably, the adjustment range of the manipulated variable (SG) is divided into a defined number of equidistant steps, and the respective values of the manipulated variable (SG) are triggered successively in time. The number of steps depends on the available adjusting time and the required accuracy of the allocation, with a subdivision into ten or twenty steps being preferred. In a preferred embodiment of the invention, several measured values, each with a measuring time period (Dt), are recorded for each discrete step of the manipulated variable (SG), and the average of the measured values is stored in the allocation table. This procedure enables the allocation table to be generated automatically, thus minimizing the personnel and time required for the adjustment.

When using blasting abrasives having different compositions and/or physical characteristics, a corresponding allocation table is prepared for each of the blasting abrasives used. During operation of the blasting apparatus, the corresponding allocation table is then used to control the feed assembly with or without feedback. This ensures during operation, when there is a change to a blasting abrasive that is already known, no adjustment of the feed assembly need be carried out but the required abrasive throughput will reach the workpiece to be processed nonetheless.

To operate the blasting apparatus, the feed assembly is controlled at the start of the blasting process such that the corresponding manipulated variable (SG) is calculated for the actual required throughput (D) from the allocation table that was defined during the adjustment and applied to the feed orifice. The manipulated variable (SG) of the feed orifice is then regulated with respect to the measured flow-sensor signal (DS) such that the throughput remains constant. Thus, at the start of the blasting process, the desired quantity of blasting particles is supplied during the operation of the feed assembly, so that the desired processing quality is achieved on the workpiece. Particularly when the workpiece is blasted for only very short periods of time, this has the advantage that the required abrasive throughput is supplied almost instantaneously and then maintained at the required level.

In addition, the actual throughput (D) is determined during operation of the feed assembly based on the throughput signal (DS) from the allocation table. During operation, the actual throughput (D) is thus either indicated via a display and/or recorded, and regulation is performed to a required throughput level.

In another advantageous embodiment of the invention, environmental conditions such as ambient temperature, air pressure, and air humidity are measured during operation and a correction value is determined from this measurement with which the flow-sensor signal (DS) and/or the manipulated variable (SG) from the allocation table are multiplied. The altered environmental conditions and their influence on the feed assembly are thus taken into account. Determination of the correction factor is based on a correlation between flow-sensor signal (DS) and manipulated variable (SG) and the environmental conditions that is determined by measurement or calculated mathematically. This offers the advantage of enabling behavior of the feed assembly that is dependent on environmental conditions to be compensated for.

In an advantageous embodiment of the invention, in a blasting apparatus that is particularly integrated into a production line, a switch is performed automatically between adjustment and operation by either feeding the blasting particles onto a workpiece or into a collecting vessel. This makes it possible to still feed the desired quantity of blasting particles to the workpiece during operation even when the blasting particles are changed or in the case of wear-related changes in the blasting particles and the associated physical characteristics. This is advantageous particularly in production lines, since a quicker adjustment can be made, thus resulting in shorter down time.

During measurement of the actual throughput (D), the weight of the blasting particles (M) is measured in the present invention in an advantageous manner by measuring the increase in the weight of a collecting vessel into which the blasting particles are fed or the decrease in the weight of a supply vessel from which the blasting particles are drawn. The measurement of the decrease in weight offers the advantage that the weight of the blasting particles leaving the supply vessel through the feed orifice is measured directly without a time delay until it reaches a collecting vessel. However, due to the immense weight involved, the measurement of the decrease in the weight of the supply vessel has the disadvantage in the case of large and/or heavy supply vessels that the accuracy of the measurement is limited as a result. In this case, it is advantageous if any delays before the collecting vessel is reached are conceded and the weight increase of the collecting vessel is measured, since that is substantially smaller in corresponding measurement time periods (Dt) and can be measured more easily and with greater precision.

Advantageously, a certain throughput level is required in order to check the adjustment of the blasting apparatus, and the actual throughput through the feed assembly is determined by measuring the weight of the outputted blasting particles (M) within a defined time period (Dt). During the check, an appropriate manipulated variable (SG) is calculated for the required throughput from the allocation table that was generated during the adjustment and applied to the feed orifice.

A direct check of the adjustment is performed immediately after the adjustment. If the throughput required in this case does not match with the throughput that is actually measured, then it is necessary to regenerate the allocation table with a greater number of discrete steps of the manipulated variable (SG) or to perform a more precise calculation of the functional correlation between the values from the allocation table. A more exact calculation of the functional correlation is preferably performed through approximation with a higher-order polynomial. The direct check ensures that a precise adjustment has been carried out before the operation of the blasting apparatus that satisfies the requirements.

A check of the adjustment is also advantageously performed after a certain period of operation during stoppages. In this case, if the required throughput does not match with the actual throughput, then another adjustment with generation of the allocation table is necessary. Regular checking of the adjustment enables operation-related influences on the feed assembly and changes in the blasting particles to be taken into account and compensated for by readjustment. Performing a check has the advantage that the generation of a complete allocation table is only done as needed, which saves time and other resources.

The method described is preferably used in n particles-blasting apparatus having a supply vessel that is connected via a feed assembly to an outlet. The feed assembly consists of a feed orifice that can be varied with respect to time and/or variables and a flow sensor arranged downstream. In addition, the blasting apparatus has a collecting vessel with a weight detector that receives the blasting particles from the feed assembly. The feed assembly is connected to a processor that regulates the feed orifice that can be varied based on time and/or variables and reads out the flow sensor. In order to evaluate the weight detector and control the processor, the latter is connected to a computer. Through the use of a collecting vessel with a weight detector, the weight of the blasting particles is measured within a defined time period, and the actual throughput is determined using the method described above. The corresponding regulation and control of the feed assembly is carried out by a computer in conjunction with the processor.

A mechanically adjustable flow section or a solenoid valve can be used as the feed orifice that can be varied with respect to time and/or variables. In the case of a ferromagnetic blasting abrasive, a solenoid valve is preferably used in which the blasting particles are hindered by an applied magnetic field while flowing through the feed orifice and opened through the application of an additional compensating magnetic field. In the solenoid valve, the throughput is especially preferably performed by a pulse duration modification, with the on/off ratio being proportional to the actuating variable.

To measure the throughput during operation, the flow sensor is a microwave sensor, an ultrasonic sensor, a baffle plate sensor, an induction sensor, or a capacitance sensor. Due to the simple and robust design, induction sensors or capacitance sensors are preferably used as flow sensors in the present invention.

In the case of blasting abrasive that has already been accelerated, it was found that it is advantageous if, in addition to the collecting vessel, an upstream separator is used in which the blasting particles are separated from other process materials and fed in its entirety into the collecting vessel. A cyclone can be especially preferably used as a separator in order to separate the blasting particles from the air. In this, the air is separated from the blasting particles and fed through a funnel into the collecting vessel. This is advantageous particularly if the blasting particles are already traveling at a high speed and simply guiding it into the collecting vessel would distort the measuring result. Using a separator, it is possible to switch between adjustment and normal operation by inserting a deflector between the outlet and the feed assembly that guides the blasting particles either into the separator or onto the workpiece to be blasted.

The deflector can be embodied as a robot that guides the outlet for the blasting particles either into the separator or onto the workpiece. Such an arrangement can be preferably converted into a production facility in which switching is performed automatically between adjustment and operation. As a result, automated adjustment can be performed, which reduces the down times of the production facility.

The processor is connected to a computer, regulates the variable feed orifice, and reads out the flow sensor. Preferably, the processor has an either digital or analog manipulated variable interface and a flow sensor interface in order to connect to the feed orifice and the flow sensor. In the analog design, the interfaces are additionally connected by an analog-to-digital converter to a microcontroller that takes over control of the feed assembly. The microcontroller stores the allocation table in a memory and is connected to a digital computer interface and/or an interface to a machine control by means of which the processor is controlled. Such a processor makes it possible to integrate the method of adjusting and operating a feed assembly of a blasting apparatus into a production line or to design it as a stand-alone solution.

BRIEF DESCRIPTION OF THE DRAWING

Embodiments of the invention are illustrated in the drawing and described in further detail below.

FIG. 3 shows the entries of the allocation table;

FIG. 4a shows a linear interpolation of the actual throughput (D) as a function of the manipulated variable (SG);

FIG. 4b shows a flow-sensor signal (DS) as a function of the actual throughput (D), which is approximated by a polynomial;

SPECIFIC DESCRIPTION OF THE INVENTION

Figure 1:
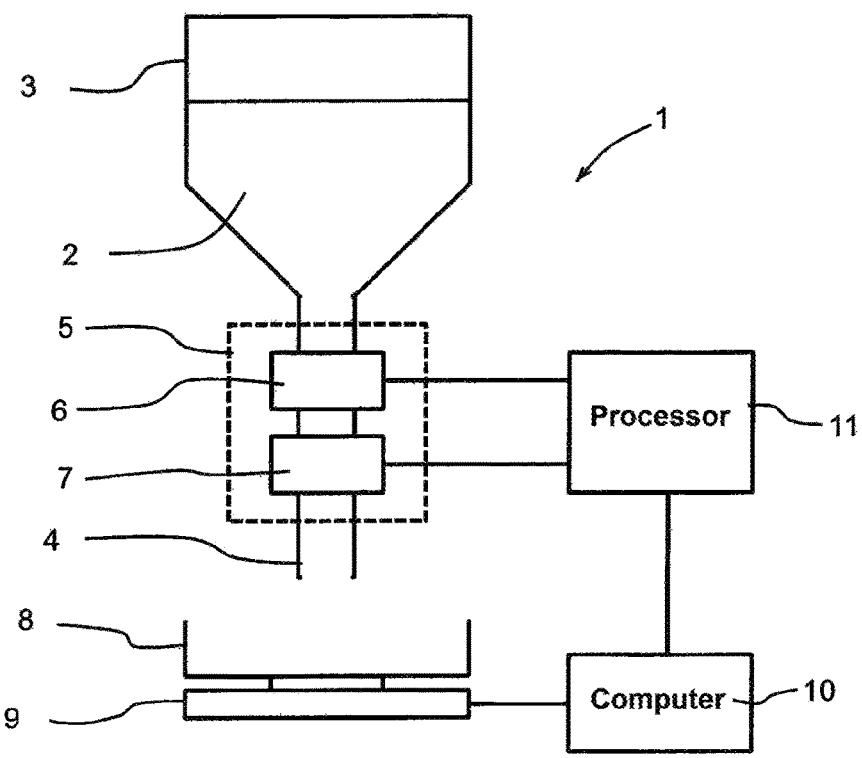
FIG. 1 shows a particle-blasting apparatus as it is used to adjust the feed assembly, with the weight detector being connected to a collecting vessel.

FIG. 1 shows a particle-blasting apparatus 1 in which the blasting particles 2 are held in a supply vessel and is delivered from same via an outlet 4. The feed assembly 5, which consists of a feed orifice 6 that can be varied with respect to time and/or variables, as well as a downstream flow sensor 7, is between the supply vessel 3 and the outlet 4. The quantity of blasting particles 2 that leaves the supply vessel 3 is predefined by the output setting of the feed orifice 6 and measured by the flow sensor 7. For calibration, the blasting particles are fed into a collecting vessel 8 and its weight (M) is measured by a weight detector 9. An output of the weight detector 9 is evaluated by a computer 10, and the throughput (D) through the outlet 4 is determined as the weight of the blasting particles allowed to pass through within a defined time period (Dt). The output setting of the variable feed orifice 6 is predefined by the processor 11 as a manipulated variable (SG), with the processor 11 simultaneously also reading out the flow-sensor signal (DS) of the flow sensor 7. The feed assembly is adjusted by simultaneous measurement of the actual throughput (D) via the weight detector 9 and measurement of the flow-sensor signal (DS)

by the flow sensor 7 with values for the manipulated variable (SG) of the feed orifice 6 predefined by a program.

Figure 2:
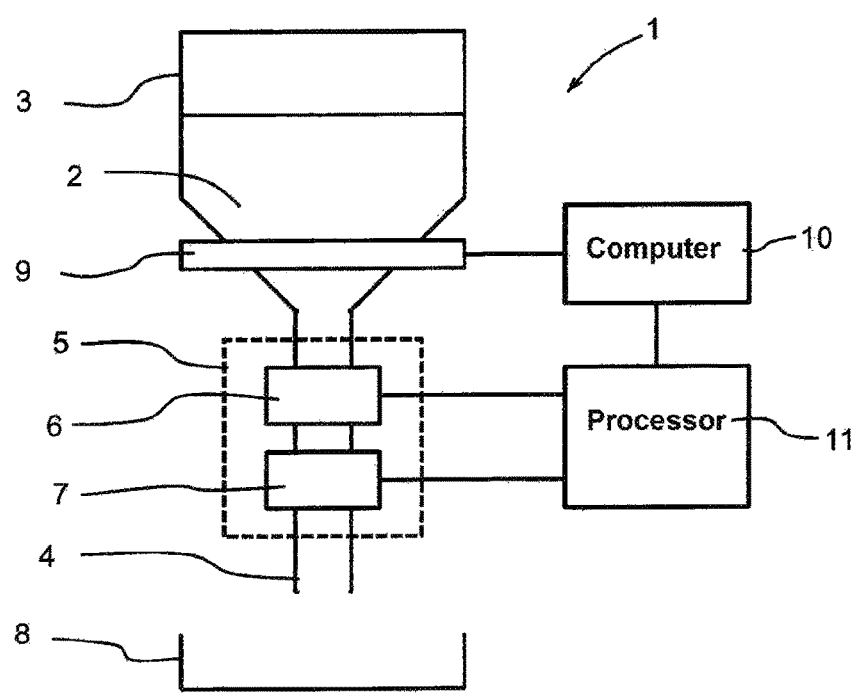
FIG. 2 shows a particle-blasting apparatus as used to adjust the feed assembly, with the weight detector being connected to a supply vessel.

FIG. 2 shows another embodiment of the invention where, unlike the particle-blasting apparatus 1 of FIG. 1, a weight detector 9 is connected to the supply vessel 3. In this embodiment, the weight of the blasting particles that flows through the feed orifice 6 is determined by having the weight detector 9 measure the decrease in the weight of the supply vessel 3. In contrast to the measurement of the increase in the weight of the collecting vessel 8, this has the advantage that the weight is measured directly as the blasting abrasive flows out of the outlet 4, and a time delay pending the arrival of the blasting particles in the collecting vessel 8 is avoided. This arrangement is advantageous particularly if the supply vessel and its contents have has a weight that can be determined with sufficient accuracy without great effort and is therefore used in a particle-blasting apparatus in which a small quantity of readied blasting particles suffices.

In an advantageous embodiment of the invention, the arrangement of a particle-blasting apparatus 1 as in FIG. 2 is used exclusively for adjusting or checking a feed assembly 5. A feed assembly that is to be used in the future during operation is first inserted into a particle-blasting apparatus 1 according to FIG. 2 between the supply vessel 3 and the outlet 4, and an allocation table between the manipulated variable (SG), the actual throughput (D), and the flow-sensor signal (DS) is then generated and stored according to the above-described method. The allocation table is then used during the operation of the current feed assembly 5, which is for example installed in a production unit in order to control same with or without feedback. Due to the relatively small quantity of blasting particles required for adjustment, the decrease in the weight of the supply vessel 3 can be easily measured during the adjustment, and a time-delay pending the arrival of the blasting particles in the collecting vessel 8 is irrelevant.

The recorded values of the actual throughput (D), the flow-sensor signal (DS), and the manipulated variable (SG) are stored in the allocation table whose entries are shown in FIG. 3. The number of preset values of the manipulated variable (SG) is arbitrary and can be selected as a function of the composition of the blasting particles, the required or available adjustment time, and the required precision. The allocation table is stored in the processor 11 and/or in the computer 10. During operation of the feed assembly 5 with a required actual throughput (D), the corresponding manipulated variable (SG) is read out from the allocation table, so that the actual required throughput is transmitted to the working process at the outlet 4 during operation. In addition, the allocation table is used during operation of the particle-blasting apparatus 1 to determine the actual throughput (D) from the measured flow-sensor signal (DS) of the flow sensor 7.

FIG. 4a shows how a correlation between the manipulated variable (SG) and the actual throughput (D) is calculated from the discrete measured values of the allocation table by linear interpolation. With the aid of this method, the manipulated variable (SG) is determined as a function of the throughput (D), so that a value for the manipulated variable (SG) at an actual required throughput (D) is also available between the discrete measured values.

FIG. 4b shows how a functional correlation between the throughput (D) and the flow-sensor signal (DS) is calculated from the discrete values of the allocation table through approximation via a polynomial. The actual throughput (D) through the outlet 4 is determined from this functional correlation from the measured flow-sensor signal (DS).

Figure 5:
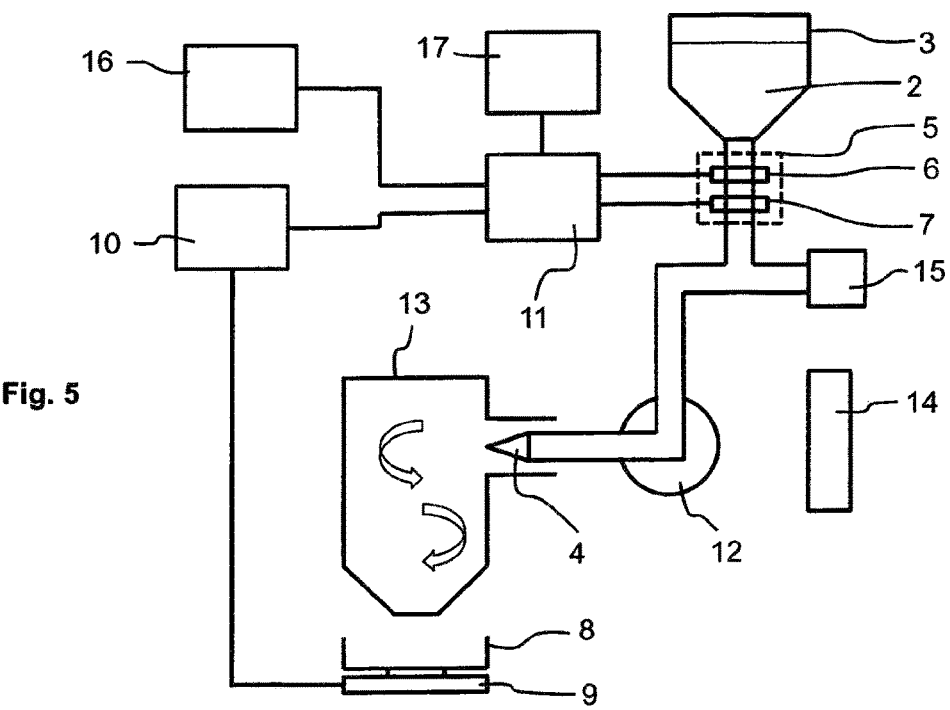
FIG. 5 shows a particle-blasting apparatus with integrated conversion between adjustment and operation.

FIG. 5 shows a particle-blasting apparatus as used during operation. The blasting particles 2 are located in the supply vessel 3 and passes through the feed assembly 5 toward an outlet 4, with a deflector 12 between the outlet 4 and the feed assembly 5 that deflects the blasting particles either into a separator 13 or onto a workpiece 14. In the separator 13, the blasting particles are separated from other process materials and recovered completely by the collecting vessel 8. The weight of the blasting particles (M) is measured by a weight detector 9. The throughput (D) through the feed orifice 6 is determined by the computer 10 by determining the weight of the blasting particles (M) emitted within a defined time period (Dt). In an advantageous embodiment of the invention, the blasting particles 2 are accelerated by an air compressor 15, thereby achieving the desired process result during the blasting of the workpiece 14. The blasting apparatus 1 is integrated into a production line by connecting the processor 11 to a higher-level machine control 16.

In an advantageous embodiment of the invention, the ambient conditions such as temperature, air pressure, and air humidity are measured by the sensor unit 17. The ambient conditions are compensated for during operation by multiplying the manipulated variable and/or the flow-sensor signal from the allocation table by a correction function that is dependent on the ambient conditions.

In another advantageous embodiment of the invention, the collecting vessel 8 from FIG. 5 is embodied as a funnel-shaped collecting vessel on whose funnel neck a check valve is mounted. At the end of the adjustment procedure, the check valve is opened and the blasting particles located in the funnel-shaped collecting vessel is guided into the collecting vessel 3 and supplied for further processing.

Figure 6:
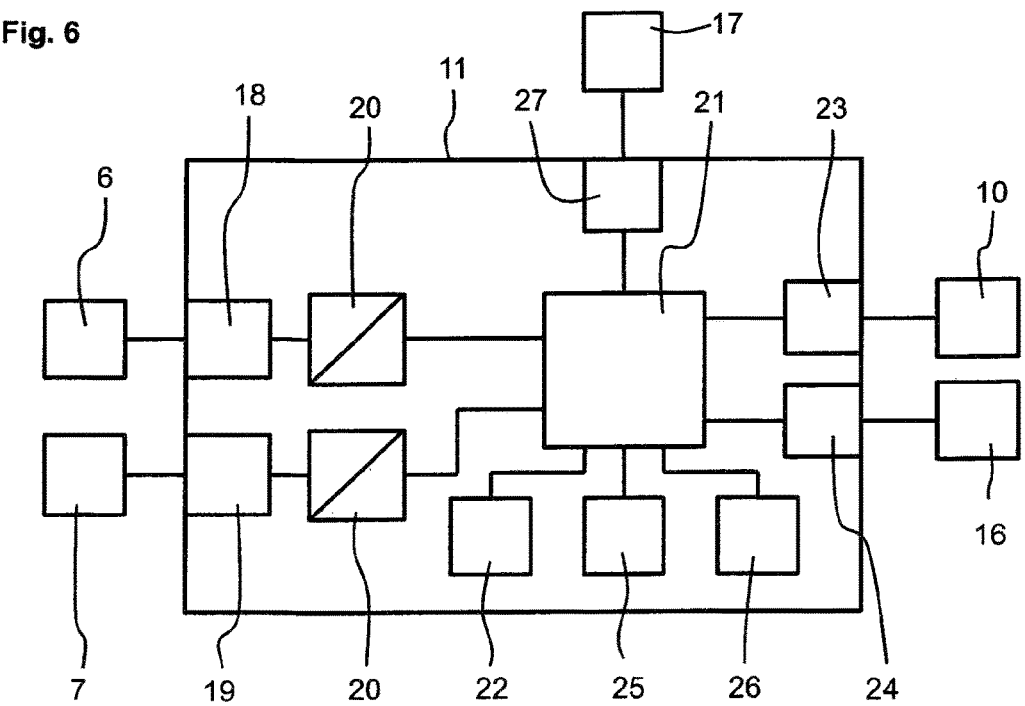
FIG. 6 shows an overview of a processor.

FIG. 6 illustrates an advantageous embodiment of the processor 11 that controls the variable feed orifice 6 and reads out the flow sensor 7. For this purpose, the processor 11 has a manipulated variable interface 18 for the manipulated variable and a flow sensor interface 19 for the flow-sensor signal (DS). These interfaces are either analog or digital. In an analogous embodiment, additional analog-to-digital converters 20 are used in order to connect to a microcontroller 21. The microcontroller 21 has a memory 22 and/or is connected thereto; it is here that the specific allocation table is stored and called up during adjustment. The connection of the processor 11 to the computer 10 is achieved via a computer interface 23. In the case of integration into a higher-level machine unit, a connection to the controller 16 is achieved via a machine interface 24. In addition, the sensor unit 17 is read out via an ambient sensor interface 27, and the ambient conditions of temperature, air pressure, and air humidity are taken into account by the processor 11 when controlling and/or regulating the feed assembly 5.

In an advantageous embodiment, the machine interface 24 has a digital signal for calling up the table, a digital enable signal for the feed orifice, an analog control signal, and an analog throughput signal. Using these signals, it is easy to integrate the processor into a higher-level memory-programmable or computer-based controller.

In another embodiment, the manipulated variable interface 18 has an additional digital enable signal that enables the opening of the feed orifice 6 as needed. An additional safety function is thus ensured and inadvertent releasing of the blasting particles prevented during operation.

In an advantageous embodiment, the processor 11 further comprises an operator control module 25, which is provided to set operating modes of the processor, as well as a display unit 26 that displays the status of the processor 11 and outputs operating parameters. In this case, the weight detector is read out directly via the processor. This embodiment of the invention enables the processor to be operated without a connection to a computer interface or to a higher-level controller.

In another advantageous embodiment, the processor 11 is advantageously integrated physically into the feed assembly 5. This embodiment of the invention offers the advantage that a connection between processor 11 and feed assembly 5 via the manipulated variable interface 18 and the flow sensor interface 19 is not needed. A physically more compact construction is thus achieved.

In another advantageous embodiment of the invention, the control function of the processor and the computer is taken over directly by a memory-programmable or computer-based higher-level controller. In this embodiment of the invention, the corresponding interfaces to the feed assembly and to the weight detector as well as the memory for the allocation table are supplied by the higher-level controller. Such an embodiment of the invention enables simple integration of the above-described method of operating or adjusting a feed assembly of a particle-blasting apparatus, particularly in production lines, with the adjustment of the feed assembly being accomplished with minimum effort and with the actually required abrasive throughput being ensured during operation.

The invention claimed is:

1. A method of adjusting or operating a particle-metering system for a particle-blasting apparatus having a feed orifice of variable flow cross section through which abrasive particles pass via a feed assembly from a supply of the particles to an outlet, the method comprising the steps of:
   measuring particle throughput through the feed orifice by a downstream flow sensor generating a flow-sensor signal;
   using the flow-sensor signal to control a manipulated variable for an output setting of the feed orifice;
   in order to adjust the feed assembly for a manipulated variable, determining actual throughput through the feed orifice by measuring a weight of outputted particles within a defined time period;
   storing the manipulated variable, the actual throughput, and the corresponding flow-sensor signal as measured values in an allocation table; and
   using relationships between the actual throughput, the manipulated variable, and the flow-sensor signal during subsequent operation.

2. The method defined in claim 1, further comprising the step, in order to adjust the feed assembly, of:
   calculating the manipulated variable from the measured values of stored in the allocation table as a function of the actual throughput.

3. The method defined in claim 2, further comprising the step, in order to adjust the feed assembly, of:
   calculating the actual throughput from the measured values of the allocation table as a flow-sensor signal.

4. The method defined in claim 2, further comprising the step of:
   calculating a functional correlation between the manipulated variable and the actual throughput as well as between the actual throughput and the flow-sensor signal by a linear interpolation between the values of the allocation table.

5. The method defined in claim 3, further comprising the step of:
   calculating a functional correlation between the manipulated variable and the actual throughput as well as between the actual throughput and the flow-sensor signal as an at least second-order polynomial from the values from the allocation table.

6. The method defined in claim 1, further comprising the steps, in order to adjust the feed assembly, of:
   altering the manipulated variable by a program in discrete steps; and
   storing the actual throughput, the flow-sensor signal, and the manipulated variable in the allocation table as the measured values for each step.

7. The method defined in claim 1, further comprising the steps, in order to check the adjustment for a required throughput from the allocation table, of:
   determining the manipulated variable;
   applying the determined manipulated variable to the feed orifice; and
   comparing the actually measured throughput to the required throughput.

8. The method defined in claim 1, further comprising the steps of:
   generating allocation tables for different particles that are used during the operation of the blasting apparatus to control the feed assembly.

9. The method defined in claim 1, further comprising the step, during operation of the feed assembly with a required actual throughput, of:
   adjusting the feed orifice according to the corresponding manipulated variable from the allocation table.

10. The method defined in claim 9, further comprising the step, during operation of the feed assembly, of:
    determining the actual throughput with respect to the flow-sensor signal from the allocation table prepared during the adjustment.

11. The method defined in claim 1, further comprising the steps, during operation of the feed assembly, of:
    measuring ambient conditions including ambient temperature, air pressure, and air humidity; and
    multiplying the manipulated variable or the flow-sensor signal from the allocation table by a correction function dependent on the measured ambient conditions.

12. The method defined in claim 1, further comprising the step of:
    switching automatically in a blasting apparatus between adjustment and operation by feeding the particles either onto a workpiece or into a collecting vessel.

13. The method defined in claim 1, further comprising the step, in order to determine the weight of the particles, of:
    measuring an increase in a weight of a collecting vessel into which the particles are fed or a decrease in a weight of a supply vessel from which the particles are fed.

14. A particle-blasting apparatus for treating a surface, the apparatus comprising:
    a supply vessel filled with blasting particles;
    an outlet directable at the surface;
    a feed assembly between the vessel and the outlet and having a feed orifice of variable flow cross section;
    a downstream flow sensor generating an output corresponding to flow through the orifice;
    a weight detector that determines the weight of the blasting particles passing through the feed assembly into a collecting vessel and generates an output corresponding thereto; and
    a processor that regulates the adjustable feed orifice in accordance with the outputs of the flow sensor and of the weight detector.

15. The particle-blasting apparatus defined in claim 14, wherein the weight detector determining the weight of the blasting particles passing through the feed assembly is connected to the collecting vessel and measures any increase in weight thereof.

16. The particle-blasting apparatus defined in claim 14, wherein the variable feed orifice is a mechanically adjustable flow section or solenoid valve.

17. The particle-blasting apparatus defined in claim 14, wherein the flow sensor is a microwave sensor, an ultrasonic sensor, a baffle plate sensor, or an induction sensor.

18. The particle-blasting apparatus defined in claim 14, wherein the processor has a manipulated-variable interface and a flow-sensor interface for connecting to the feed orifice, a microcontroller with memory controlling the processor and connected via a digital computer interface and/or a machine interface to a computer and/or a controller.

19. A particle-blasting apparatus for treating a surface, the apparatus comprising:
   a supply vessel filled with blasting particles;
   an outlet directable at the surface;
   a feed assembly between the vessel and the outlet and having a feed orifice of variable flow cross section;
   a downstream flow sensor generating an output corresponding to flow through the orifice;
   a weight detector that determines the weight of the blasting particles passing through the feed assembly into a collecting vessel, that is connected to the supply vessel to measure a decrease in weight thereof, and that generates outputs corresponding thereto; and
   a processor that regulates the adjustable feed orifice in accordance with the outputs of the flow sensor and of the weight detector.

20. A particle-blasting apparatus for treating a surface, the apparatus comprising:
   a supply vessel filled with blasting particles;
   an outlet directable at the surface;
   a feed assembly between the vessel and the outlet and having a feed orifice of variable flow cross section;
   a downstream flow sensor generating an output corresponding to flow through the orifice;
   a weight detector that determines the weight of the blasting particles passing through the feed assembly into a collecting vessel and generates an output corresponding thereto;
   a processor that regulates the adjustable feed orifice in accordance with the outputs of the flow sensor and of the weight detector; and
   an additional separator between the feed assembly and the collecting vessel that separates the blasting particles from other process materials so that the blasting particles reach the collecting vessel in its entirety.

21. The particle-blasting apparatus defined in claim 20, further comprising:
   a deflector between the feed assembly and the outlet and guiding the blasting particles either into the separator or onto the workpiece to be blasted.

* * * * *